United States Patent [19]

Lindquist

[11] Patent Number: 4,601,450
[45] Date of Patent: Jul. 22, 1986

[54] PIPE KEEPER AND METHOD OF MAKING

[76] Inventor: Jonas T. Lindquist, 7654 Tripp Ave., Skokie, Ill. 60076

[21] Appl. No.: 715,889

[22] Filed: Mar. 25, 1985

[51] Int. Cl.⁴ .............................................. F16B 15/00
[52] U.S. Cl. ...................................... 248/71; 248/74.1
[58] Field of Search ........................ 248/71, 74.1, 74.3, 248/74.5, 48.1, 216.1, 48.2, 231; 52/11

[56] References Cited

U.S. PATENT DOCUMENTS

| 500,616 | 7/1893 | Rosenquest | 248/71 |
| 1,160,047 | 11/1915 | Conner | 248/71 |
| 1,476,764 | 12/1923 | Morhoff et al. | 248/71 |
| 1,586,024 | 5/1926 | Boyd | 248/71 |
| 1,711,240 | 4/1929 | Merryweather | 248/71 |
| 1,787,734 | 1/1931 | Rowling | 248/73 |
| 2,286,562 | 6/1942 | Merryweather | 248/71 |
| 2,701,115 | 2/1955 | Rachlin | 248/71 |
| 3,278,146 | 10/1966 | Simon | 248/73 |

FOREIGN PATENT DOCUMENTS 732641  9/1932  France .................................. 248/71

Primary Examiner—J. Franklin Foss
Attorney, Agent, or Firm—Walter L. Schlegel, Jr.

[57] ABSTRACT

A pipe keeper comprises a strap which is attached to a building wall between the ends of the strap. The strap is wrapped around a pipe such as a downspout from a rain gutter. Then the ends of the strap are pulled toward each other to clamp the pipe, as for example by a wedge having sloping wedge faces in engagement with complementary wedge surfaces on the ends of the strap within hooks thereof which receive hooks of the wedge.

2 Claims, 9 Drawing Figures

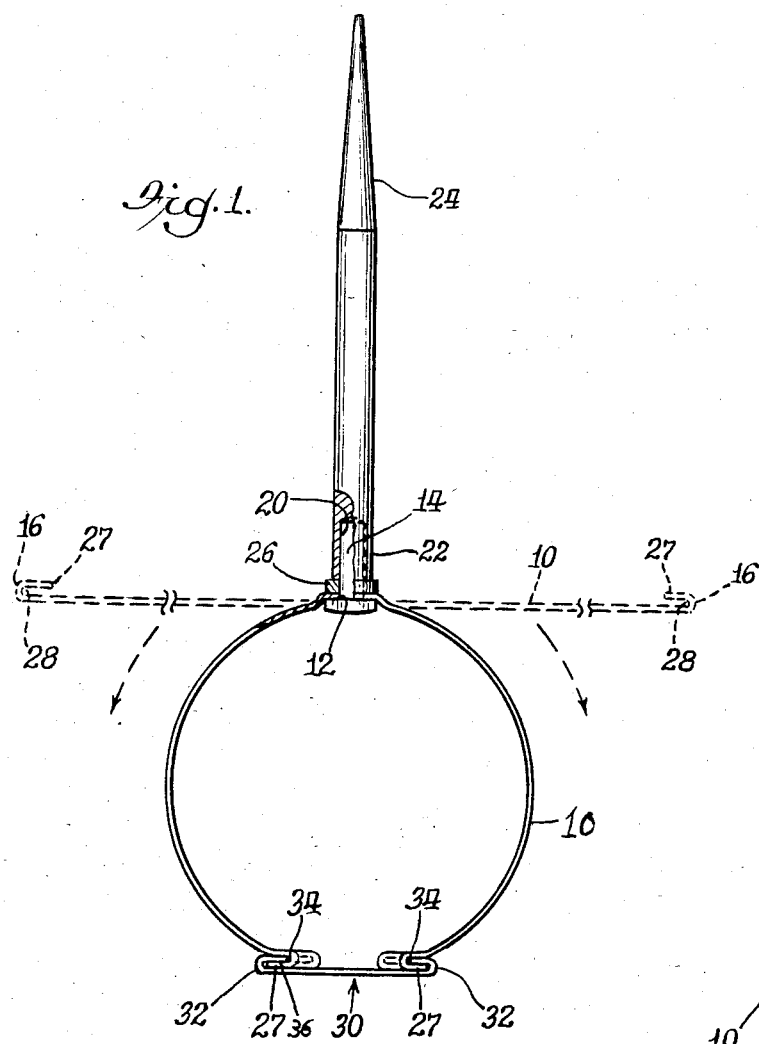
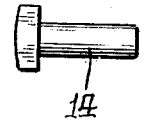
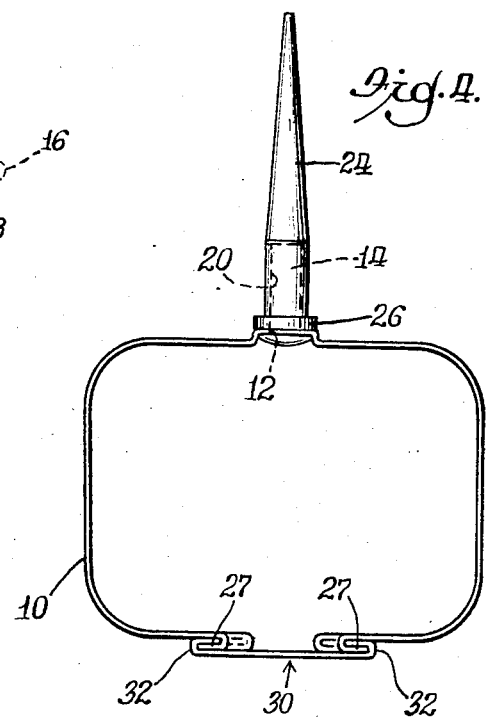
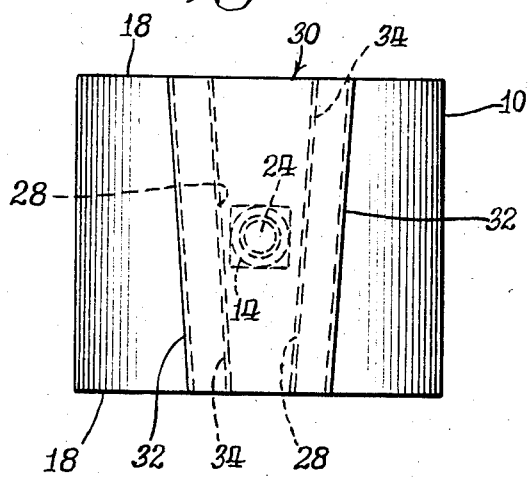
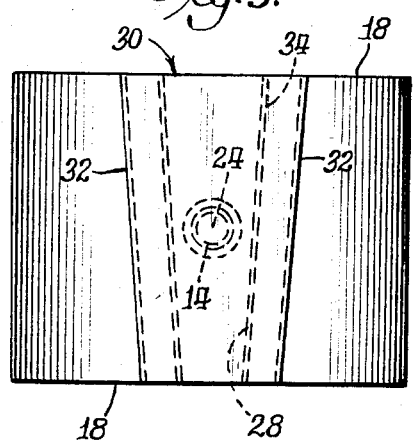

PIPE KEEPER AND METHOD OF MAKING

This invention relates to a keeper for a pipe such as a downspout which conveys water from a rain gutter along the underside of a roof of a building.

According to prior art practices such a downspout has been clamped against a wall of the building by a strap nailed at its ends to the building or by a cast steel keeper driven into the building with an arm embracing the downspout or sometimes by a keeper to which the downspout was nailed resulting in clogging of the downspout by solid material such as leaves flowing with the water. The prior art practice of clamping the downspout against the building also had the disadvantage of requiring drain elbows to accommodate the horizontal offset between the building wall and the gutter.

Accordingly, a primary object of the invention is to devise a keeper which can position the downspout at a desired predetermined distance from the building wall, thereby avoiding the use of elbows if desired.

Another object of the invention is to clamp the downspout within the keeper at a desired predetermined position without impairing the flow capacity of the downspout.

Still another object of the invention is to attach the keeper spike or screw to the downspout clamp in such a manner as to achieve a unitary keeper construction.

A more specific object of the invention is to attach a keeper strap between its ends to the building and then clamp the free ends of the strap around the downspout, as by a wedge.

A still more specific object of the invention is to provide a keeper spike or screw with a longitudinal recess in its base and to hold the base against the outer side of the keeper strap which has a hole aligned with the recess, then driving a pin through the hole into the recess until a head on the pin is seated against the inner side of the strap with a collar seated around the recess against the base and against the outside of the strap, and interlocking the base as a unitary structure with the pin, the collar and the strap.

The foregoing and other objects and advantages of the invention will become apparent from the following specification and the accompanying drawings wherein:

FIG. 1 is a bottom plan view of a novel keeper embodying the invention, with the keeper strap shown by phantom lines before assembly with a downspout and by solid lines at assembly position;

FIG. 2 is a side elevational view of the keeper shown in FIG. 1;

FIG. 3 is a side elevational view of the pin which attaches the keeper spike of FIG. 1 to the strap;

FIGS. 4 and 5 show a modification of the novel keeper, FIG. 4 being a bottom plan view and FIG. 5 being a side elevational view;

Figure 6:
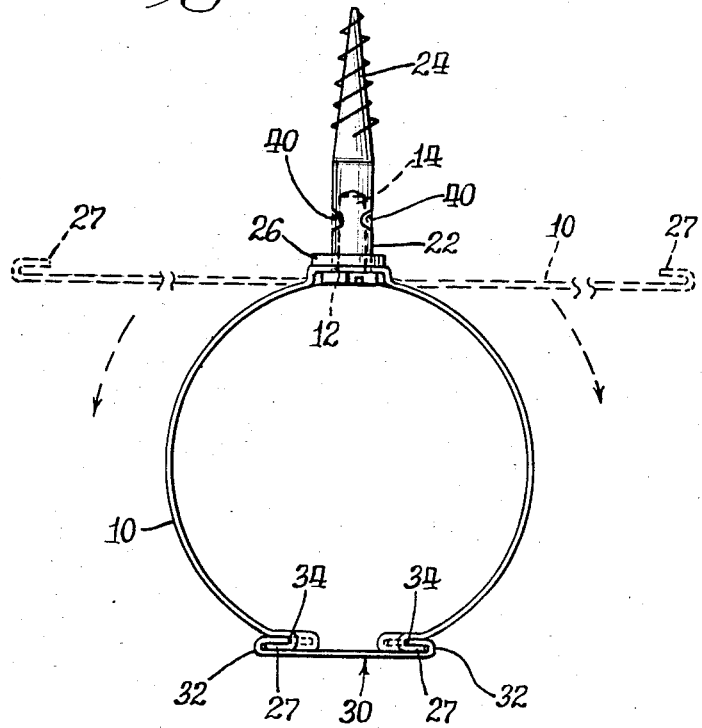
FIGS. 6 and 7 show another modification of the novel keeper, FIG. 6 being a bottom plan view similar to FIG. 1 and FIG. 7 being a side elevational view with the strap wedge removed.

Describing the invention in detail and referring first to the embodiment of FIGS. 1-3, the novel keeper comprises a band or strap 10 adapted to clamp a round cross-section downspout (not shown). The strap comprises a hole 12 through which a pin 14 extends. The head of the pin engages the inner surface of the strap 10 approximately midway between its ends 16 and its sides 18.

The pin is tightly fitted into an elongated recess 20 of the base 22 of an anchor 24 disclosed as a heat treated steel masonry spike adapted to be driven into mortar cementing two bricks (not shown) together.

The base 22 is seated against a collar 26 which seats against the outer surface of the strap 10 around its hole 12, so that the strap is clamped between the collar and the head of the pin 14.

The ends 16 of the strap 10 are bent into the form of hooks 27 the inner surfaces 28 of which slope toward each other to define wedge surfaces which are facing away from each other when the strap is manually assembled around a downspout (not shown) in the position shown by solid lines in FIGS. 1 and 2 from the pre-assembly position shown by phantom lines in FIG. 1.

A wedge 30 has its lateral edges bent into hooks 32, the free ends of which have wedge faces 34 corresponding in shape and slope to surfaces 28, whereby as the wedge is urged to the position shown in FIGS. 1 and 2 the ends 16 of the strap 10 are pulled toward each other to snugly clamp the downspout (not shown) within the strap.

The wedge 30 is held in assembled relationship by the hooks 27 and 32, and friction along the wedge surfaces 28 and the wedge faces 34 prevent the wedge from loosening. The hooks 27 and 32 are also in snug frictional engagement with each other as at 36 (FIG. 1) and this restrains the wedge 30 from loosening in service.

In the manufacture of the novel keeper shown in FIGS. 1-3, the base 22 of the anchor 24 is heated, preferably to a temperature of about 500° F.-600° F. from end to end of the recess 20 which is slightly smaller in diameter than the pin 14. The collar 26 is seated against the strap 10 in the position thereof shown by phantom lines in FIG. 1. The heated base is seated against the collar 26, and the pin 44 is then driven into the recess until the strap 10 is clamped between the collar 26 and the head of the pin 14 with the collar 26 clamped against the base 22. As the base 22 cools it contracts around affording a shink for the pin locking it into a unitary structure therewith and with the strap 10 and the collar 26.

The anchor 24 is then driven into the mortar with the strap 10 in the phantom line position of FIG. 1 until the strap can be manually wrapped around the downspout (not shown) in the solid line position of the strap shown in FIG. 1 whereat the loop defined by the strap 10 is in vertical alignment with the gutter (not shown) to which the downspout is connected. This eliminates the need for drain elbows between the gutter and the downspout.

FIGS. 4 and 5 show a modification of the novel keeper, and parts corresponding to those of FIGS. 1-3 are identified by corresponding numerals. In the modification, the anchor 24 which is also in the form of a heat treated steel masonry spike is much shorter so that it can be driven into the mortar all the way to the collar 26 thereby positioning the strap or band 10 very close to the building wall (not shown). For this reason the strap is shaped to receive a rectangular cross-section downspout (not shown) as is common where the downspout is held close or against the building wall. Such a keeper does require the use of elbows to connect the downspout to the gutter (not shown) at the lower edge of the roof line, however, in the case of a brick building with overhanging eaves, elbows would be desirable anyhow.

The manufacture, assembly and use of the keeper shown in FIGS. 4 and 5 is the same as heretofore described in connection with FIGS. 1-3.

Figure 7:
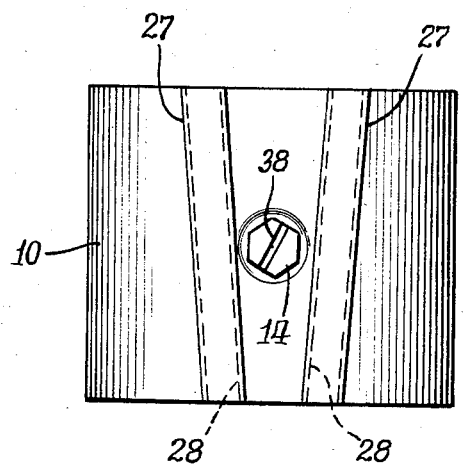

Another modification of my novel downspout keeper is shown in FIGS. 6 and 7, and parts corresponding to those of FIGS. 1 and 2 are identified by corresponding numerals. This modification is particularly adapted to buildings with walls of wood so that the anchor 24 is shown in the form of a wood screw and is made of a relatively soft, malleable material such as, for example, aluminum or mild steel. The head of the pin 14 is preferably hexagonal in form and is also provided with a screw driver slot 38.

After the pin 14 has been driven tightly into the recess 20 as shown in FIG. 6 with the strap 10 in the phantom line position therein, the base 22 of the anchor 24 is crimped to form a plurality of dents 40 to interlock the anchor 24, the pin 14, the collar 26 and the strap 10 into a unitary structure which is rotated by the slot 38 or by the hexagonal head of the pin 14 to drive the screw shaped anchor into the wood building structure. The strap 10 is then manually wrapped around a downspout (not shown) in the solid line position of the strap shown in FIG. 6, and the wedge 30 is applied as heretofore described in connection with FIGS. 1-3. It should be noted that in FIG. 7, the wedge 30 has been removed so that the head of the pin 14 may be clearly seen.

Figure 8:
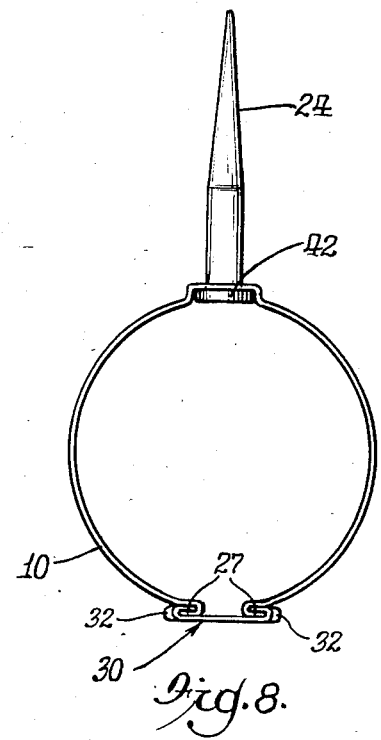
FIGS. 8 and 9 show still another modification, FIG. 8 being a top plan view and FIG. 9 being a side elevational view.
Figure 9:
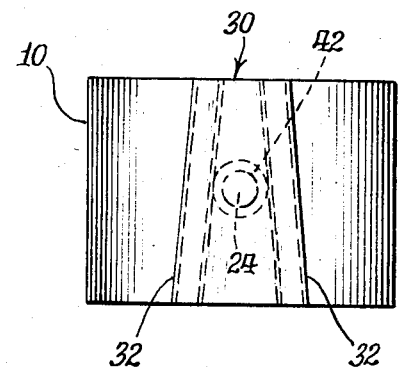

FIGS. 8 and 9 show still another modification of the invention wherein parts corresponding to those of FIGS. 1 and 2 are identified by corresponding numerals. In this modification the pin 14 and collar 26 are completely eliminated, and the anchor 24 has a head 42 bearing against the inner side of strap or band 10. The anchor may be either a masonry spike or a wood nail depending upon the construction of the building to which the keeper is attached. As in the previous embodiments the strap is attached to a building wall (not shown) in an open position of the strap by striking the head 42 as with a hammer (not shown) until the strap 10 is in a desired position close to its supporting wall. The strap is then manually wrapped to the position shown in FIGS. 8 and 9 around a downspout (not shown) and the wedge 30 is applied as in the previously described embodiments.

The embodiment of FIGS. 8 and 9 has the advantage of economy but lacks the strength of construction in the previously described embodiments and leaves the choice of a suitable anchor 24 to the workman in the field with the attendant possibility of a careless erroneous choice.

Also in the embodiment of FIGS. 8 and 9 a careless workman in the field could damage the strap 10 by excessive force on the head 42 of the anchor 24. In the embodiments of FIGS. 1-7 the pin 14 is preferably slightly shorter than the length of the recess 20, as for example by one or two thousands of an inch, when the head of the pin 14 clamps the strap 10 against the collar 26. Continued application of force to the head of the pin causes its inner end to bottom against the inner end of the recess 20 due to deflection of the head of the pin and the strap thereby preventing damage to the strap during assembly of the keepers disclosed in FIGS. 1-7.

It should also be noted that when the keeper is assembled with its strap clamped, the small end of the wedge 30 is preferably facing upwardly so that gravity functions to hold the wedge in assembled position.

What is claimed is:

1. A pipe keeper comprising a strap, means for attaching the strap between its ends to a support structure, and means engaged with said ends for clamping the strap around a pipe said first-mentioned means comprising an anchor having an elongated recess in one end aligned with a hole in the strap, said one end facing the strap at the outer side thereof, a pin tightly received in said recess and having a head bearing against the strap at the inner side thereof, and a collar, said collar bearing against the recess, the pin bottomed at the inner end of said recess and having a shrink fit in the recess to hold the pin, the collar, the strap, and said anchor in an assembled relationship.

2. A pipe keeper comprising a band, means for attaching the band between its end to a supporting structure, the ends of said band being spaced from each other and comprising wedge surfaces facing away from each other, and wedge means engaging said surfaces for clamping the band around an associated pipe, attaching means being characterized by an anchor member having an elongated recess in one end thereof aligned with a hole through the band, said one end facing the band at the outer side thereof, a pin tightly received in said recess and having a head seated against said band at the inner side thereof, and a collar tightly seated against the member around said recess, the member, the collar, the pin and the band being interlocked with each other in a unitary structure by a shrink fit of said pin in said anchor member.

* * * * *